US006882311B2

(12) United States Patent
Walker et al.

(10) Patent No.: US 6,882,311 B2
(45) Date of Patent: Apr. 19, 2005

(54) DIGITAL BEAMFORMING RADAR SYSTEM

(75) Inventors: Joel F. Walker, Malibu, CA (US); Daniel G. Gonzalez, Topanga, CA (US); Anand Kelkar, Calabasas, CA (US); Norman Lamarra, Agoura Hills, CA (US)

(73) Assignee: Malibu Research Associates, Calabasas, CA (US)

(*) Notice: Subject to any disclaimer, the term of this patent is extended or adjusted under 35 U.S.C. 154(b) by 0 days.

(21) Appl. No.: 10/121,964

(22) Filed: Apr. 12, 2002

(65) Prior Publication Data

US 2002/0171584 A1 Nov. 21, 2002

Related U.S. Application Data

(60) Provisional application No. 60/283,457, filed on Apr. 12, 2001.

(51) Int. Cl.[7] ............................ H01Q 3/26; H04B 1/26
(52) U.S. Cl. ........................................ 342/368; 455/318
(58) Field of Search ................................ 342/368, 377; 455/318, 319

(56) References Cited

U.S. PATENT DOCUMENTS

| | | | | |
|---|---|---|---|---|
| 6,054,948 A | * | 4/2000 | Dean | 342/372 |
| 6,701,137 B1 | * | 3/2004 | Judd et al. | 455/121 |
| 2001/0015698 A1 | * | 8/2001 | Tokoro | 342/70 |
| 2002/0064246 A1 | * | 5/2002 | Kelkar et al. | 375/347 |

OTHER PUBLICATIONS

Ruvin, Abraham E. et al, "Digital Multiple Beamforming Techniques for Radar," EASCON '78, Arlington, VA USA Sep. 1978), pp. 152–162.*

Suzuki, Ryutaro et al, "Mobile TDM/TDMA System with Active Array Antenna," GLOBECOM '91, 1991, pp. 1569–1573.*

Steyskal, Hans, "Digital Beamforming– An Emerging Technology," IEEE Military Communications Conf, 1988, Oct. 1988, pp. 399 403 vol. 2.*

Jeon, Seong–Sik et al, "Active Quasi–Yagi Antenna with Direct Conversion Receiver Array with Digital Beamforming," 2000 IEE Antennas and Propagation Society International Symposium, Jul. 2000, pp. 1268–1271, vol. 3.*

Shiga, Nobuo et al, "MMIC Family for DBS Downconverter With Pulse–doped GaAs MESFETs," IEEE GaAs IC Symposium, 1991, pp. 139–142.*

Rose, John F., "Digital Beamforming Receiver Technology," 1990– Antennas and Propagation Society International Symposium May 1990, pp 380–383, vol. 1.*

Konishi, Yoshihiro et al, "Satellite Receiver Technologies,", IEEE Trans. on Broadcasting, vol. 34, No. 4, Dec. 1988, pp. 449–456.*

* cited by examiner

*Primary Examiner*—Gregory C. Issing
(74) *Attorney, Agent, or Firm*—Hoffmann & Baron, LLP

(57) ABSTRACT

A receiver for a digital beamforming radar system includes a plurality of antenna elements, low-noise block converters, one or more analog-to-digital converters, and a processor. The antenna elements receive a radar signal and output a received signal. The low-noise block converters are modified commercially available components used in satellite television systems, respond to the received signal from a corresponding antenna element, and output an intermediate frequency signal. The low-noise block converters include at least one amplifier, a mixer, and a local oscillator input. The local oscillator input enables an external local oscillator signal to be inputted to the mixer. The analog-to-digital converters are responsive to the intermediate frequency signal of a corresponding low-noise block converter. The processor is responsive to the digital signals output by the analog-to-digital converters.

19 Claims, 7 Drawing Sheets

DIGITAL BEAMFORMING RADAR SYSTEM

CROSS-REFERENCE TO RELATED APPLICATION

This application claims the benefit of U.S. Provisional Application No. 60/283,457, filed Apr. 12, 2001, which is incorporated herein by reference.

BACKGROUND OF THE INVENTION

1. Field of the Invention

The present invention generally relates to radar systems and more particularly to a digital beamforming radar system that utilizes a modified commercially available low-noise block converter (LNB) in a receive signal path.

2. Description of the Prior Art

In conventional digital beamforming radar systems, an amplifier, mixer, filter, and analog-to-digital converter are connected to elements of an antenna array. Signals from respective analog-to-digital converters are then subjected to various beamforming algorithms in a digital processor.

In general, digital beamforming radars utilize high-frequency electromagnetic waves, such as microwaves or millimeter waves. Analog devices, such as amplifiers, filters, and mixers, which are able to operate at these frequencies, are typically very expensive.

In addition, conventional beamforming radars require a considerable quantity of these analog devices due to the corresponding number of elements in the antenna array. Accordingly, high production costs have become unavoidable.

One way to improve the performance of these radars is to increase the quantity of antenna elements. However, increasing the number of elements requires a correspondingly greater number of high-frequency analog devices, which also increases the cost of the system. In addition, increasing the number of analog devices results in increasing overall size requirements for the radar system.

A phased array receiving antenna, such as that used in a digital beamforming radar, includes an array of individual antenna elements and electronic phase shifting components, which are typically arranged in a planar array to receive an electromagnetic signal. Adjusting the phase shift and/or delay of a received signal through each of the elements and delay components and summing the signals enables the antenna to be electronically steered. Accurate electronic steering of the antenna requires that the relative phase shift and/or delay through each of the antenna elements and delay components be accurately known and adjusted.

Thus, the large number of discrete components required for beamforming radars creates various problems, such as those discussed above, as well as matching between components, periodic calibration, and variability of system performance. These problems become more critical when additional components are required due to an increase in antenna elements or to improve the performance and accuracy of the radar system.

OBJECTS AND SUMMARY OF THE INVENTION

It is an object of the present invention to provide a digital beamforming radar system that is cheaper, requires less space, is simpler to manufacture, and has fewer discrete components than comparable conventional beamforming radar systems.

It is another object of the present invention to provide a digital beamforming radar system in which there is a substantial decrease in requirements concerning matching and periodic calibration of components.

It is yet another object of the present invention to provide a digital beamforming radar system, which integrates substantially all of the front-end components in a receive signal path within a low-noise block converter (LNB).

It is still another object of the present invention to provide a digital beamforming radar system that utilizes a low-cost, high-production, low-noise block converter (LNB), which is typically used in satellite television applications, that has been effectively modified for use in radar systems.

In accordance with one form of the present invention, a digital beamforming radar system is provided with a receiver, which includes a plurality of antenna elements, low-noise block converters, analog-to-digital converters, and a processor. The antenna elements receive a radar signal and output a received signal.

The low-noise block converters are modified from commercially available components used in satellite television systems, respond to the received signal from a corresponding antenna element, and output an intermediate frequency signal. The low-noise block converters include at least one amplifier, a mixer, and a local oscillator input. The local oscillator input enables an external local oscillator signal to be inputted to the mixer in the low-noise block converter.

The analog-to-digital converters are responsive to the intermediate frequency from a corresponding low-noise block converter. The processor is responsive to the digital signals output by the analog-to-digital converters.

In accordance with another embodiment of the present invention, a method of making a low-cost, efficient low-noise block converter for use in a digital beamforming radar receiver is provided, which includes the steps of providing a commercially available low-noise block converter used in satellite television systems, modifying the low-noise block converter to disable a local oscillator circuit, and providing a local oscillator input. The local oscillator circuit is internal to the low-noise block converter and the local oscillator input enables an external local oscillator signal to be inputted to a mixer internal to the low-noise block converter.

In accordance with yet another form of the present invention, a method for making a digital beamforming radar system includes the steps of making a receiver, which includes the steps of coupling a plurality of antenna elements to low-noise block converters, coupling the low-noise block converters to analog-to-digital converters, and coupling the analog-to-digital converters to a processor. The antenna elements receive a radar signal and output a received signal.

The low-noise block converters are modified from commercially available components for use in satellite television systems and are responsive to the received signal from a corresponding antenna element. The low-noise block converters output an intermediate frequency signal and include an amplifier, a mixer, and a local oscillator input.

The local oscillator input enables a local oscillator signal to be externally inputted to a mixer in the low-noise block converter. The analog-to-digital converters are responsive to the intermediate frequency signal of a corresponding low-noise block converter, and the processor is responsive to the digital signal from at least one of the analog-to-digital converters.

These and other objects, features, and advantages of this invention will become apparent from the following detailed description of illustrative embodiments thereof, which is to be read in connection with the accompanying drawing.

DETAILED DESCRIPTION OF THE PREFERRED EMBODIMENTS

A preferred goal of the present invention is the illumination of an entire area of interest with a broad transmit beam. The method and system formed in accordance with the present invention utilize commercial off-the-shelf-based (COTS) low-noise receiver and processing components. With these components it becomes possible to simultaneously process a plurality of highly accurate receive beams.

The present invention preferably utilizes high-speed digital signal processors (DSP) and high-production low-noise block converters (LNB) to solve digital beamforming radar problems in a cost-effective manner.

Figure 1A:
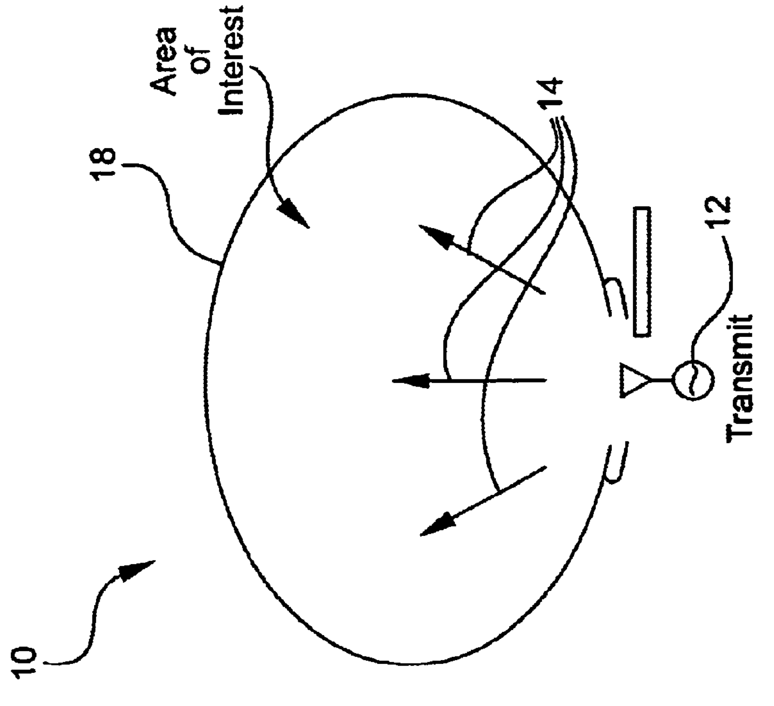
FIGS. 1*a* and 1*b* show a preferred application of a digital beamforming radar system formed in accordance with the subject invention.
Figure 1B:
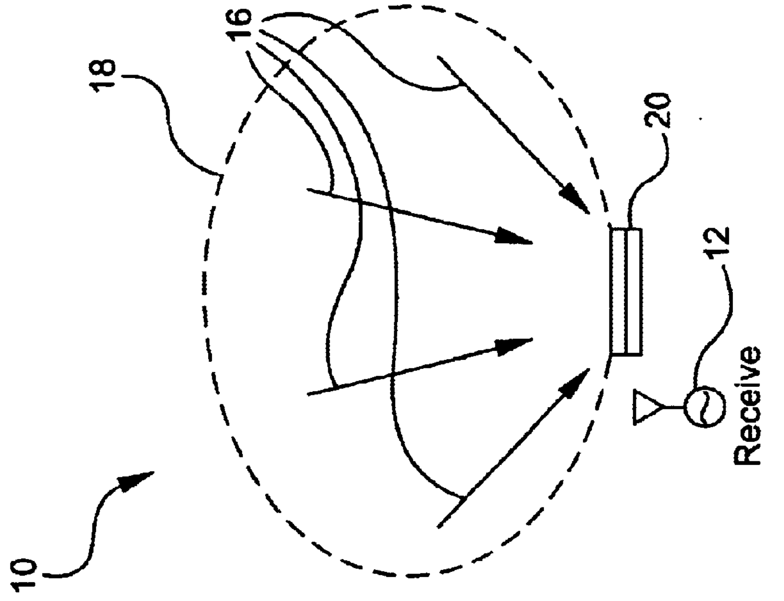

FIGS. 1*a* and 1*b* show a top level representation of a preferred physical embodiment for a radar system 10 formed in accordance with the subject invention. A coverage area 18 of a radar transmit array or aperture 12 is preferably illuminated by broad transmit beams 14, as shown in FIG. 1*a*.

Reflected energy 16 from objects within the illuminated coverage area 18 is preferably received by a receive array or aperture 20, as shown in FIG. 1*b*. The reflected energy 16 is preferably combined simultaneously in a high-speed digital processor to form a set of multiple receive beams.

Figure 2:
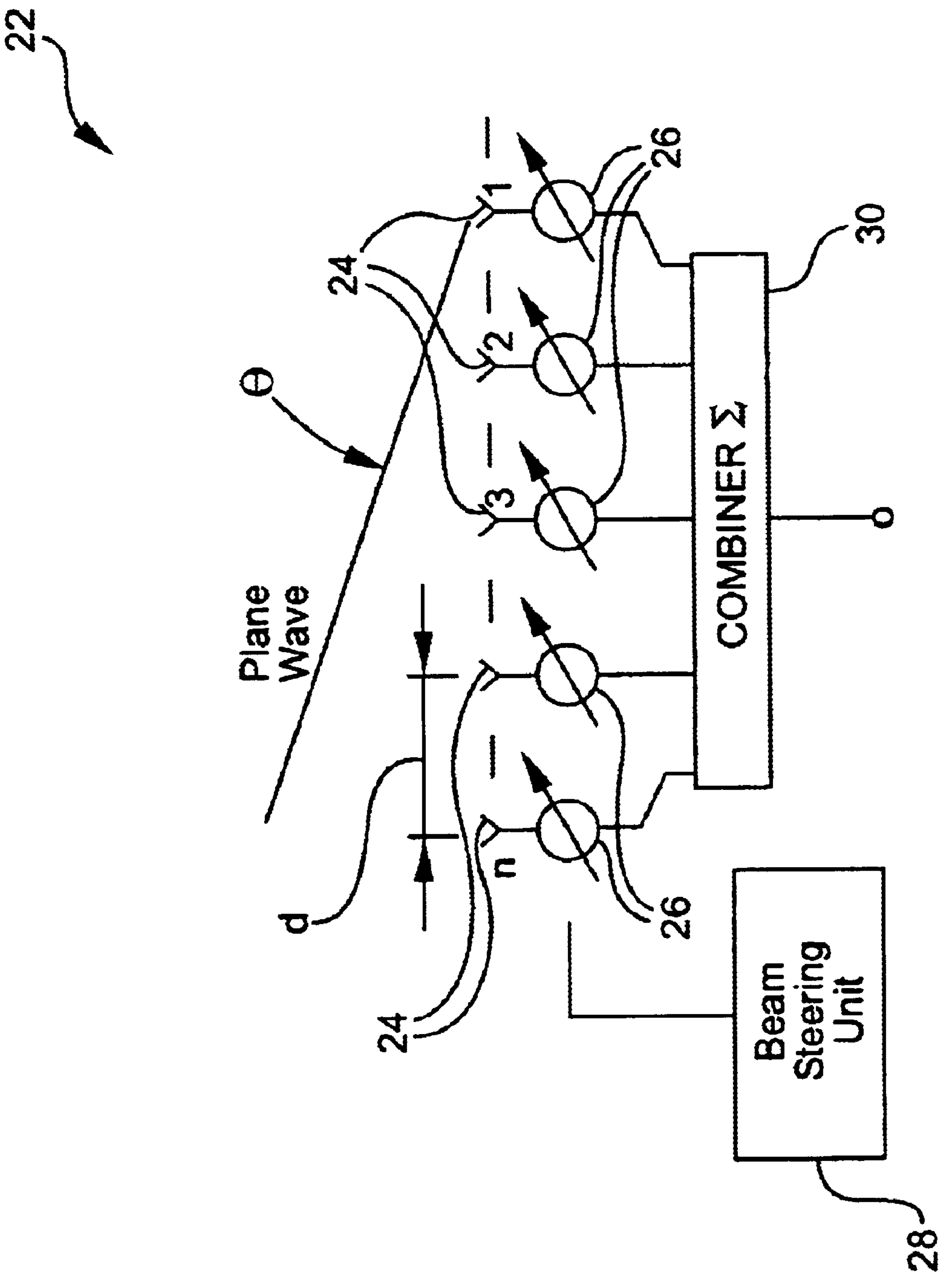
FIG. 2 (Prior Art)
FIG. 2 shows a conventional one-dimensional phased array.

FIG. 2 shows a conventional one-dimensional phased array 22, which includes a series of antenna elements 24, each of which is controlled by an adjustable time delay element 26 or phase shifter. Output signals from the adjustable time delay elements 26 are combined in a combiner 30, which yields a focused beam in a unique angular direction, as determined by the settings of the adjustable time delay elements 26. These delay settings are computed by an antenna beam steering unit 28.

The setting for each of the time delay elements $\psi(n)$ in terms of a wavelength of operation $\lambda$, an element number n, an interelement spacing d, and a desired direction of the beam to be formed $\theta$ is preferably provided by equation (1) as follows:

$$\psi_n = \frac{2\pi}{\lambda}(n-1)d\sin\theta \tag{1}$$

The setting is preferably applicable within radio or microwave frequencies.

Figure 3:
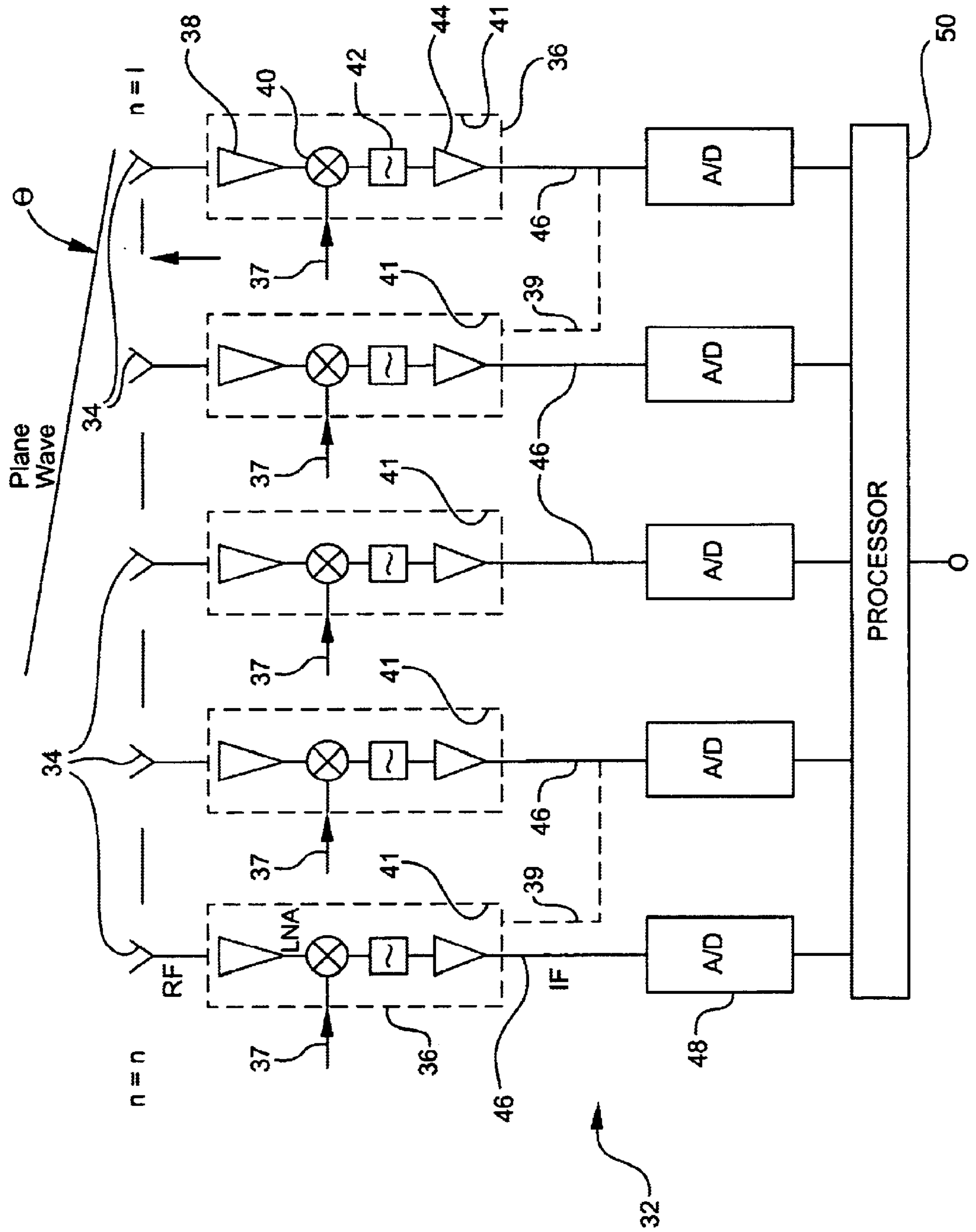
FIG. 3 shows a receive portion of a digital beamforming radar formed in accordance with the present invention.

FIG. 3 shows a preferred embodiment of a receive portion 32 of the digital beamforming radar formed in accordance with the present invention. The receive portion 32 preferably includes a plurality of antenna elements 34, each of which is preferably coupled to a low-noise block converter (LNB) 36. The LNB 36 preferably includes a low-noise amplifier 38, a mixer 40, a filter 42, and an intermediate frequency (IF) amplifier 44.

Each of the components in the LNB 36 are preferably electrically coupled substantially in series. The purpose of the LNB 36 is preferably to amplify and then convert the signal received by a corresponding antenna element 24 to a convenient intermediate frequency (IF) signal 46.

In general, the LNB is a key element in commercial digital broadcast satellite (DBS) applications. The front end of a satellite television receive path typically includes an LNB, and the sensitivity of the LNB directly determines the antenna size. Each LNB preferably includes a local oscillator (LO), which is used to downconvert satellite transmissions to a convenient intermediate frequency (IF) for processing by the satellite receiver.

The LNB provides a sensitive amplifier at a cost that is driven very low by the large volume required in commercial markets. In radar applications, the low-noise characteristics of the LNB are advantageous. However, one problem has always been the presence of an internal local oscillator. In the radar receiver formed in accordance with the present invention, the local oscillator within the LNB represents a downconversion frequency element, which is not under the control of the otherwise auto-coherent radar process.

To exploit the advantages of commercially available LNB, these problems had to be overcome. Thus, modifications were made to the LNB for effective application to the digital beamforming radar receiver formed in accordance with the present invention, which is shown in FIG. 3, as follows:

1. The local oscillator circuit within the LNB was disabled.
2. Access 37, as shown in FIG. 3, was provided to the local oscillator injection point within the LNB 36 preferably via an external connector. This access 37 enables the local oscillator to be controlled in a coherent fashion i.e., in concert with other LNB 36 in the system, as well as allowing the resulting intermediate frequency signal 46 to be compatible with the digital portion of the receive signal path in the analog-to-digital converters 48.
3. The gain of one or more of the amplifiers 38, 41 within the LNB 36 is adjusted to be compatible with dynamic range requirements of the radar preferably by shorting, disabling, disconnecting, or otherwise removing the amplifier from the circuit.
4. The bandwidth of the filter 42 is preferably modified for compatibility with the digital beamforming radar system.
5. Damping means 41, such as positioning carbon-based absorbent material internal to the LNB, is preferably provided to control oscillations that result from any or all of steps 1–4 described above.

The local oscillators for several LNB 36 elements may be offset by an amount commensurate with the bandwidth of the radar. In this way, the outputs of more than one LNB are preferably frequency multiplexed and applied to a single high-speed analog-to-digital converter for subsequent digital downconversion, as represented by dotted lines 39 in FIG. 3.

Thus, the beamforming radar formed in accordance with the present invention preferably uses low-cost commercially available LNB as the only analog component required in the receive signal path. The unmodified LNB is commercially available as Part No. 150262 from California Amplifier, Camarillo, Calif. 93012. The commercially available LNB is modified by Malibu Research, Calabasas, Calif. 91302-1974; assigned Part No. 415960; and identified as a low-noise block downconverter. Alternatively, the LNB may be custom made to include a local oscillator input.

One or more high-speed analog-to-digital converters, which preferably digitize the intermediate frequency components, enable the remainder of the downconversion process to take place in the digital domain. Digital radio components that are able to perform these functions have found widespread acceptance in the commercial market and are becoming inexpensive at rates similar to Moore's Law for computer hardware i.e., 50% reductions every two years.

Additional benefits are afforded by the beamforming radar formed in accordance with the present invention. Regarding adaptive clutter cancellation, a radar beam in classic ground-based radar applications is preferably directed as close to the ground as possible without letting clutter return signals trigger the target detection process. This requires very stable analog-to-digital conversion and places stringent requirements on signal purity in the receiver, exciter, and transmitter.

In the digital beamforming approach formed in accordance with the present invention, a synthetic beam is preferably placed on the ground to record a sample of the clutter signals at a specific azimuth, which is preferably called a clutter reference beam. Then, the clutter signal sample is preferably added to all the other beams and adaptively weighted to minimize the signal strength of each beam. The clutter reference beam preferably does not include a target return signal, and the signal energy in the target beam is preferably dominated by clutter return signals.

Minimizing the clutter energy using any one of a variety of approaches, such as least mean square (LMS), minimum mean square error (MMSE), maximum entropy method (MEM), and the like preferably maximizes the signal-to-clutter ratio in a beam that is pointing towards the target. Thus, the approach formed in accordance with the present invention significantly reduces signal purity requirements on individual components in the radar system.

Multipath is a term used to describe signal distortion that may result from the constructive and destructive combination of a desired signal and one or more reflection signals. In radar, the most common source of reflection is the terrain under the target. A fully active receive aperture preferably allows the option of re-phasing the elements of the antenna to maximize signal strength. This causes the target return to increase in strength at the expense of accuracy, thereby increasing the detection range performance envelope of the beamforming radar.

As shown in FIG. 3, the intermediate frequency (IF) signals 46 outputted from the LNB 36 preferably include antenna data reflected from those objects that are illuminated by substantially the entire angular extent of the transmit beam. Each of the IF signals 46 is preferably inputted to a dedicated analog to digital (A/D) converter 48, which renders the signals suitable for processing by a high-speed digital processor 50. It is in the high-speed digital processor or digital signal processor (DSP) 50 that it is preferably possible to simultaneously form not just a single receive beam, as provided by the conventional array shown in FIG. 2, but to form a plurality of receive beams that are able to cover the full angular extent of the transmit illumination beam.

In the past, such digital beamforming implementations were too costly for the commercial marketplace. However, the present invention advantageously utilizes a low-cost commercially available LNB, the cost of which has been significantly reduced by the satellite television market, one or more high-speed digital signal processors (DSP), and associated signal processing peripheral cards or mezzanines that include analog-to-digital converters 48 to implement a cost-effective yet accurate digital beamforming radar system.

Figure 4:
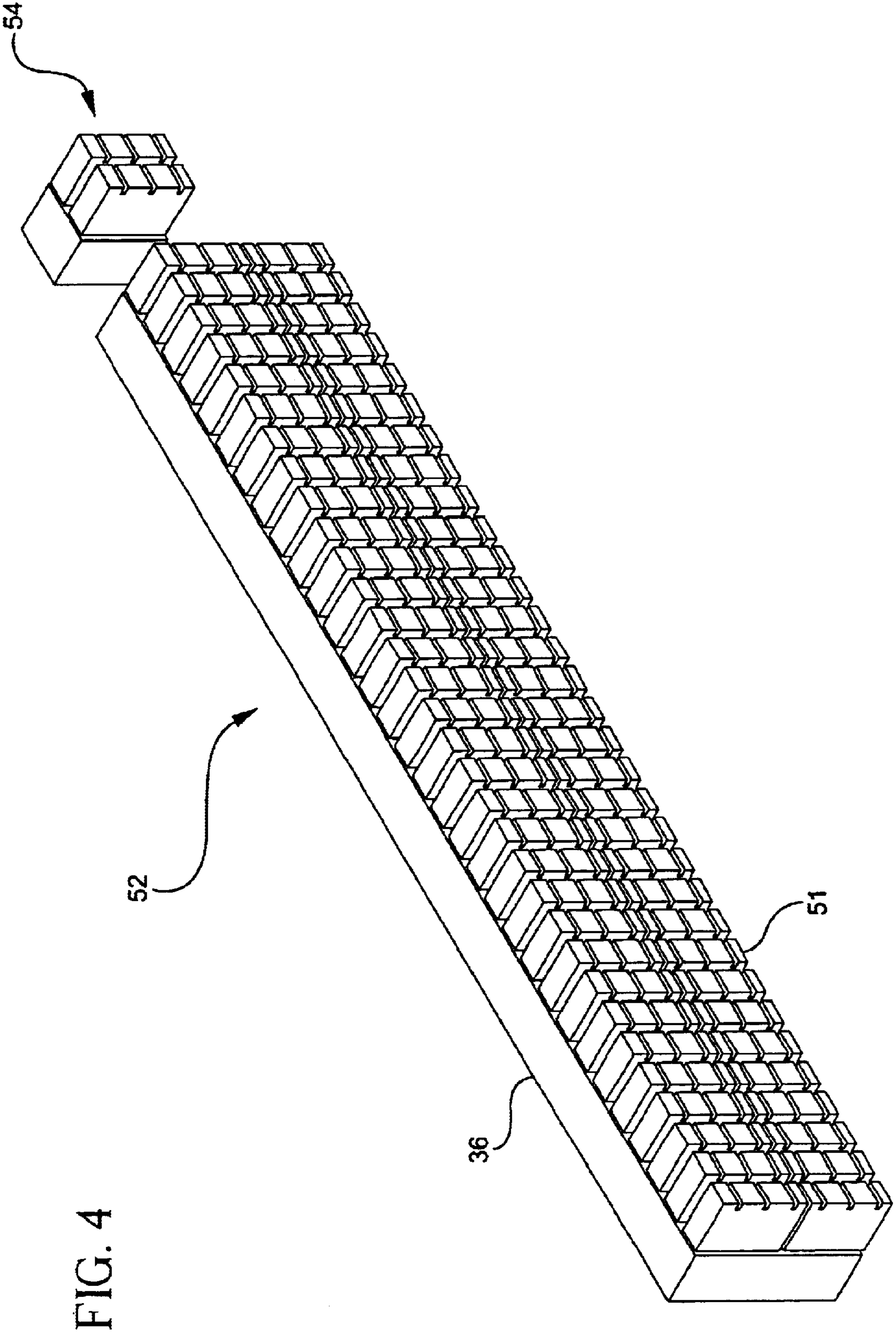
FIG. 4 shows a preferred embodiment of a receive antenna array and a transmit antenna array formed in accordance with the present invention.

FIG. 4 shows one preferred embodiment of a receive aperture or array 52, which includes two parallel rows of thirty-two (32) receive elements 51, and a transmit aperture or array 54. The angular coverage of each of the receive elements 51 is preferably illuminated by the widebeam dual element transmit array 54. The physical length of the receive array 52 is preferably about 0.50 m, although these dimensions are substantially dependent on the desired operating frequency of the radar system and the particular application.

The receive array 52 includes individual LNB 36, which are preferably housed to the rear of the receive array 52, for each of the receive elements 51. Similarly, at least a portion of the transmit components is preferably housed to the rear of the transmit elements in the transmit array 54.

Figure 5:
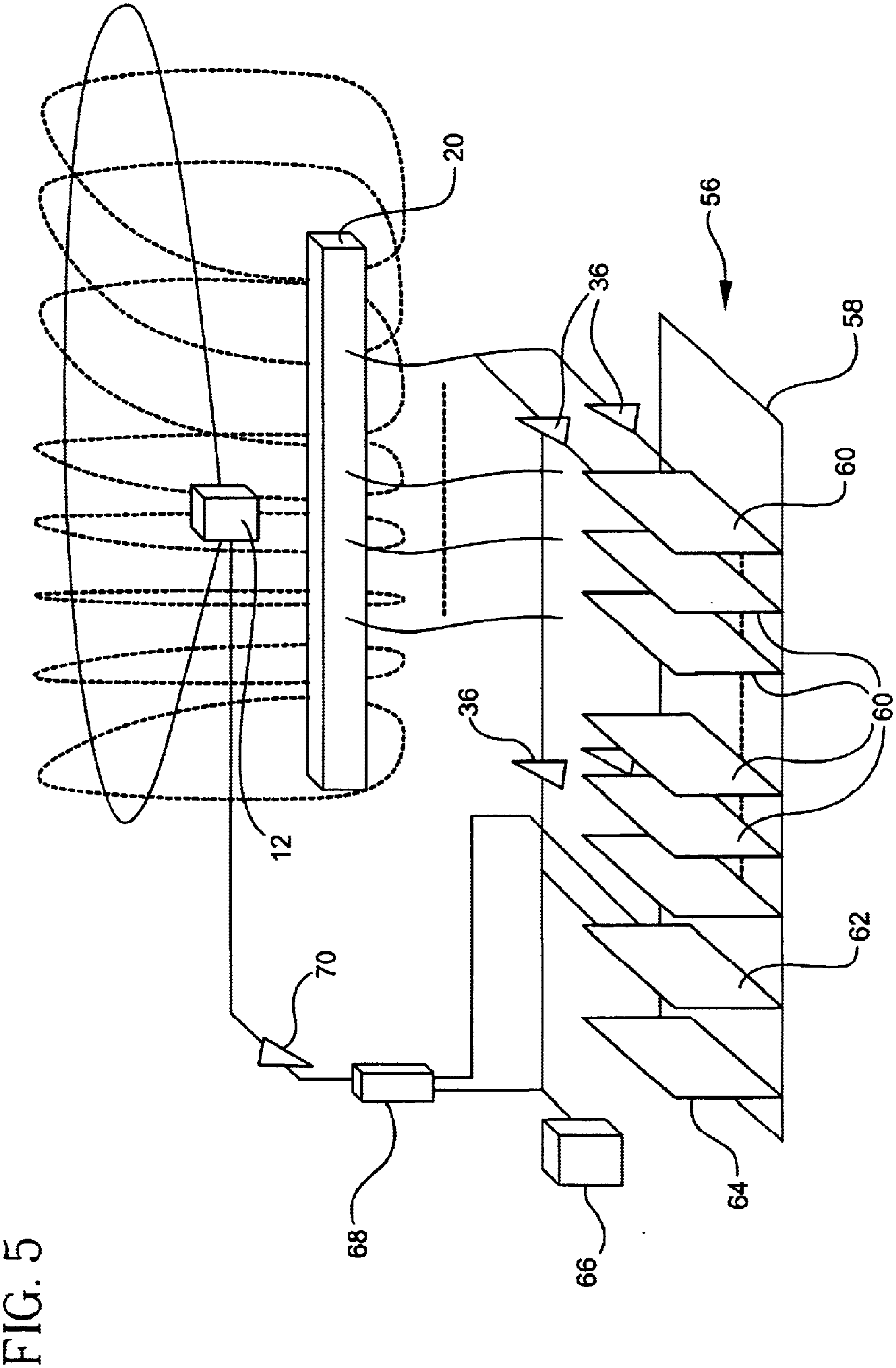
FIG. 5 shows a block diagram of a preferred hardware embodiment of the digital beamforming radar system formed in accordance with the present invention.

FIG. 5 shows a block diagram of one embodiment of the present invention using the transmit and receive apertures or arrays shown in FIGS. 1*a* and 1*b*. The receive array 20 may be about 0.50 m in length and about 0.05 m in width and the transmit array 12 is may be about 0.10 m in length and about 0.05 m in width, although alternative dimensions, such as a substantially square perimeter, are contemplated to be within the scope of the present invention. The receive array 20 is preferably separated from the LNB 36, which are shown in FIG. 5 as triangles adjacent to a processor chassis 56.

Referring to the processor chassis 56, the processing and control components are preferably inserted into a compact Peripheral Component Interconnect (cPCI) backplane 58. Alternatively, other backplane processing configurations, such as VME, VME64, Std Bus, and the like may be used.

Eight (8) commercial off-the-shelf (COTS) Quad DSP cards 60 are preferably inserted into the right-hand portion of the cPCI backplane 58. Each of the DSP cards 60 preferably includes an eight (8) channel COTS IF-to-digital converter (IFDC), which is shown as a multi-channel IFDC 62 in FIG. 6, that enables four (4) receive antenna elements to be processed in each Quad DSP card 60.

The cPCI backplane 58 preferably also includes a waveform synthesizer and digital input/output (I/O) card 62, which coordinates the timing of the transmit array and the transmit waveform. The entire processing unit is controlled by a host processor 64, which is preferably a Pentium III card available from Force Computers, San Jose, Calif. 95101. However, it is envisioned that any processor may be used depending on the particular design specifications and preferences.

The transmit portion of the radar preferably includes a stable reference oscillator 66, the output of which is applied to an IF-RF upconverter 68. In the upconverter 68, the signal from the stable reference oscillator 66 is preferably modulated by outputs from the waveform synthesizer and digital I/O card 64 to yield a transmit waveform. The transmit waveform is then preferably amplified in a solid-state amplifier 70 and fed to the elements of the transmit aperture 12.

Figure 6:
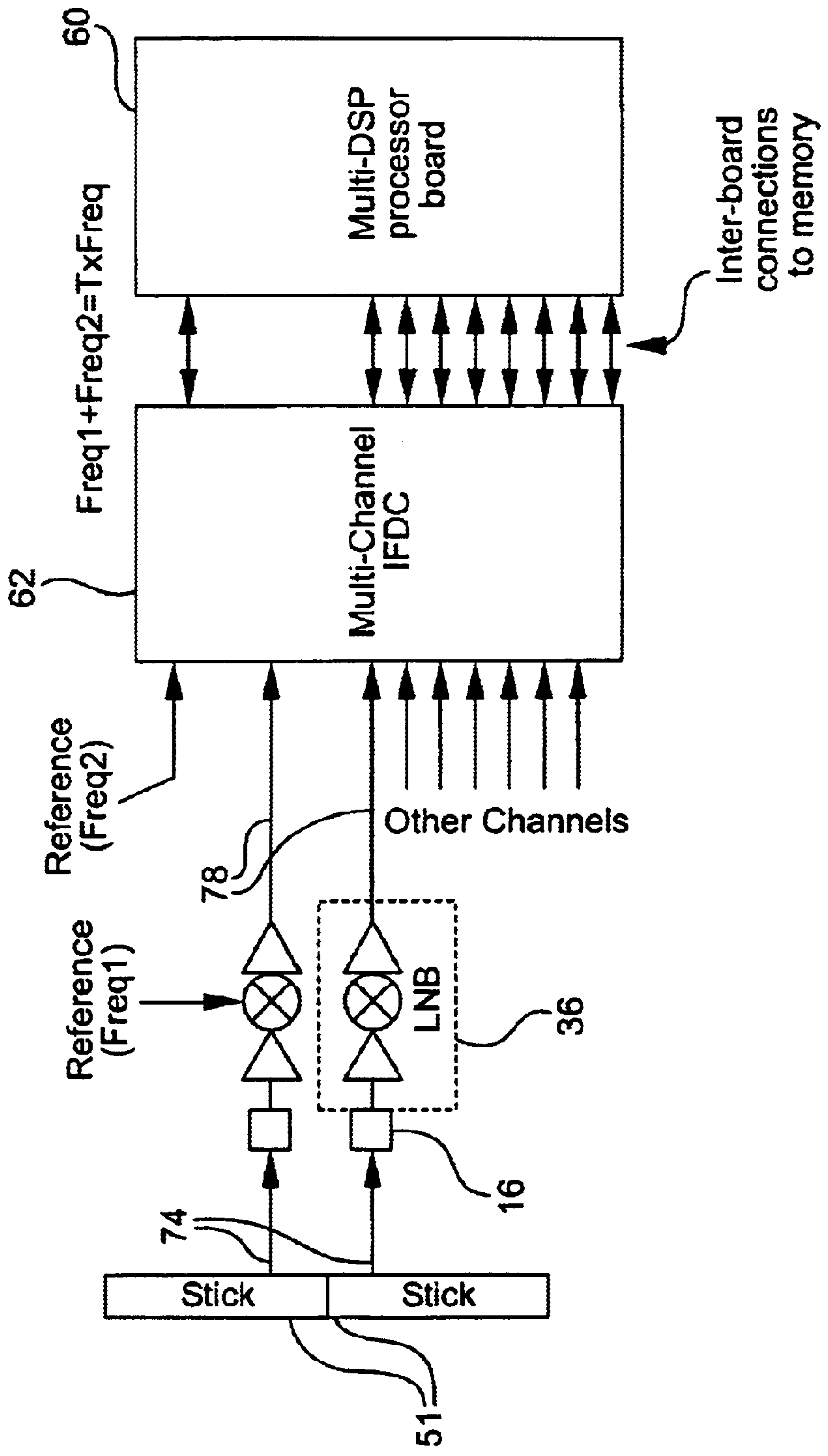
FIG. 6 shows a block diagram of a receive portion of the radar system shown in FIG. 5.

FIG. 6 shows a block diagram of the radar receive portion front end beginning at a pair of antenna elements 51 and continuing through to the DSP card 60. Preferably, there are a total of 32 pairs of elements 51. A pair of vertical antenna elements 51 is shown, the outputs of which preferably yield sum and difference signals 74. The development of sum and difference signals 74 enables the processor 60 to ascertain the elevation of a given target within a scan volume.

The sum and difference signals 74 from the microwave components 72 of the antenna are each preferably routed through a bandpass filter/limiter 76, which minimizes the effects of out-of-band interference. After filtering, the LNB 36 preferably amplifies and downconverts the sum and difference signals 74 to an intermediate frequency. In this manner, the LNB 36 provides two functions. First, the LNB 36 establishes the system noise figure by providing a high-gain, low-noise amplifier, and then the LNB 36 converts the amplified signals to intermediate frequency signals 78, which are preferably below 60 MHz, for further processing.

The sum and difference IF signals 78 are preferably inputted to the DSP cards 60, which determine the subsequent processing and routing of these signals and the information contained in these signals. The IF signals may also be routed to channels in the multi-channel intermediate frequency-to-digital converter (IFDC) 62. The IFDC 62 is a specific implementation of direct intermediate frequency-to-digital data conversion, which is preferably commercially available as a mezzanine card plugged directly into each of the Quad DSP cards 60. As the intermediate frequency signals 78 are downconverted, the multi-channel IFDC 62 preferably transfers the digital data directly to memory in the DSP cards 60 where beamforming and other radar functions are performed.

Figure 7:
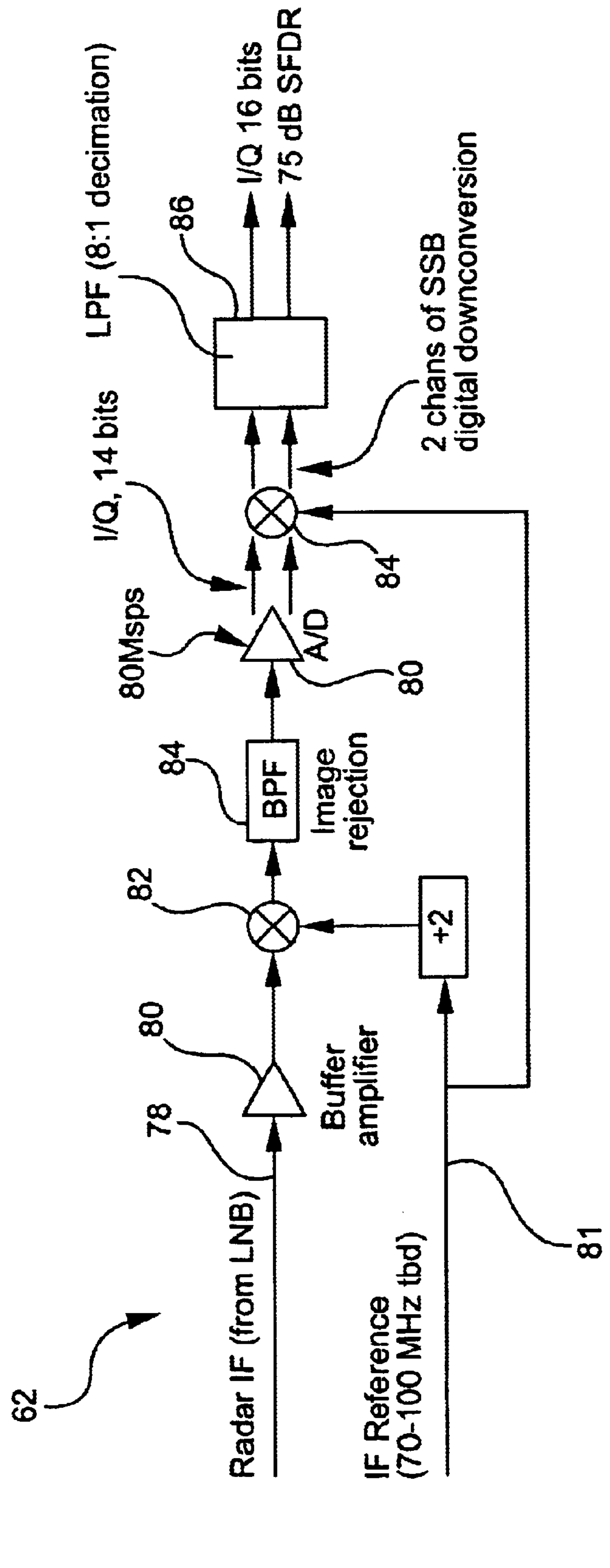
FIG. 7 shows a block diagram of a channel in an intermediate frequency-to-digital converter (IFDC) shown in FIG. 6.

FIG. 7 shows a more detailed block diagram of the IFDC 62. The IF signal 78 from a particular LNB is preferably routed through a buffer amplifier 80 and applied to a mixer 82, which, with an IF reference signal 81, preferably reduces the amplified signal to a baseband signal. The baseband signal is then preferably applied to a bandpass filter 84 for image rejection, an 80 Msps (mega samples/second) analog-to-digital converter 86, a mixer 84 for downconversion, a low-pass filter 86, and then stored in memory on the DSP card.

The DSP board 60 is preferably implemented using one of several commercially available designs, such as a C6X01 board available from Texas Instruments Corporation, Dallas, Tex. 75266. Two versions of the C6X01 board are currently available, the C6701 and the C6201, which are able to perform floating point and integer operations, respectively. The four-channel IFDC 62 mezzanine card, which is also commercially available from Texas Instruments, preferably plugs into sockets on the C6X01 card, and provides both power and data pathways directly into the digital signal processor on the C6X01 card.

The present invention preferably uses software to perform real time functions. The software is necessary to efficiently control computation and data transfer within a given DSP for implementing digital beamforming. This software is commercially available from Malibu Research, Calabasas, Calif. 91302-1974.

Therefore, the digital beamforming radar system formed in accordance with the present invention is cheaper, requires less space, is simpler to manufacture, and has fewer discrete components than comparable beamforming radar systems in the prior art. Such a radar system also substantially decreases requirements concerning matching and periodic calibration of analog components. In addition, a digital beamforming radar system formed in accordance with the present invention integrates substantially all of the front-end components in a receive signal path within a low-noise block converter by using a low-cost, high-production, low-noise block converter, which is typically used in satellite television applications, that has been modified for use in radar systems.

Although illustrative embodiments of the present invention have been described herein with reference to accompanying drawings, it is to be understood that the invention is not limited to those precise embodiments, and that various other changes and modifications may be effected therein by one skilled in the art without departing from the scope or spirit of the invention.

What is claimed is:

1. A digital beamforming radar system, which comprises:

a receiver, the receiver including:

a plurality of antenna elements, at least one of the plurality of antenna elements being adapted to receive a radar signal and output a received signal;

a plurality of low-noise block converters, at least one of the plurality of low-noise block converters including an amplifier, a mixer, and a local oscillator input, the at least one of the plurality of low-noise block converters being responsive to the received signal from a corresponding antenna element, the at least one of the plurality of low-noise block converters outputting an intermediate frequency signal, the local oscillator input being adapted to enable a first local oscillator signal to be externally inputted to the at least one low-noise block converter, the mixer being responsive to the first local oscillator signal, at least one of the plurality of low-noise block converters comprising a commercially available low-noise block converter for use in satellite television systems, the commercially available low-noise block converter comprising an internal local oscillator circuit, the commercially available low-noise block converter being modified to provide the local oscillator input and to disable the internal local oscillator circuit;

at least one analog-to-digital converter, the at least one analog-to-digital converter being responsive to the intermediate frequency signal of a corresponding low-noise block converter, the at least one analog-to-digital converter outputting a digital signal; and a processor responsive to the digital signal of the at least one analog-to-digital converter, the processor being adapted to perform digital beamforming algorithms on the digital signal to form a plurality of beams.

2. A digital beamforming radar system as defined by claim 1, wherein the local oscillator input includes an external connector.

3. A digital beamforming radar system as defined by claim 1, wherein the at least one amplifier is at least one of disabled, shorted, and disconnected.

4. A digital beamforming radar system as defined by claim 1, wherein at least one of the plurality of low-noise block converters includes a custom made low-noise block converter, which includes a local oscillator input.

5. A digital beamforming radar system as defined by claim 1, wherein the digital beamforming radar includes a dynamic range, the at least one amplifier being adapted to be adjusted for compatibility with the dynamic range.

6. A digital beamforming radar system as defined by claim 1, wherein at least one of the plurality of low-noise block converters includes a damping means, the damping means being adapted for substantially suppressing oscillations within the low-noise block converter.

7. A digital beamforming radar system as defined by claim 1, wherein at least one of the plurality of low-noise block converters includes a filter circuit, the filter circuit being electrically connected in series with the at least one amplifier and the mixer.

8. A digital beamforming radar system as defined by claim 7, wherein the filter circuit includes a bandwidth, the bandwidth being modified for compatibility with the digital beamforming radar system.

9. A digital beamforming radar system as defined by claim 1, further comprising a transmitter.

10. A method of adapting low-cost, efficient, low-noise block converters for use in a digital beamforming radar receiver comprising the steps of:

providing a first commercially available low-noise block converter used in satellite television systems;

modifying the first commercially available low-noise block converter to disable a local oscillator circuit, the local oscillator circuit being internal to the first commercially available low-noise block converter; and providing a local oscillator input, the local oscillator input being electrically coupled to a mixer, the mixer being internal to the first commercially available low-noise block converter, the local oscillator input being adapted to enable a first local oscillator signal to be externally inputted to the mixer.

11. A method of adapting low-cost, efficient, low-noise block converters for use in a digital beamforming radar receiver as defined by claim 10, wherein the first commercially available low-noise block converter includes at least one amplifier, the at least one amplifier including a gain, the method further comprising the step of disabling the at least one amplifier.

12. A method of adapting low-cost, efficient, low-noise block converters for use in a digital beamforming radar receiver as defined by claim 10 further comprising the step of providing a damping means internal to the first commercially available low-noise block converter, the damping means substantially suppressing oscillations in the first commercially available low-noise block converter.

13. A method of making a digital beamforming radar system comprising the steps of:

making a receiver comprising the steps of:

coupling a plurality of antenna elements to a plurality of low-noise block converters, at least one of the plurality of antenna elements being adapted to receive a radar signal and output a received signal, at least one of the plurality of low-noise block converters including an amplifier, a mixer and a local oscillator input, the at least one of the plurality of low-noise block converters being responsive to the received signal from a corresponding antenna element, the at least one of the plurality of low-noise block converters outputting an intermediate frequency signal, the local oscillator input being adapted to enable a first local oscillator signal to be externally inputted to the at least one low-noise block converter, the mixer being responsive to the first local oscillator signal, at least one of the plurality of low-noise block converters comprising a commercially available low-noise block converter for use in satellite television systems, the commercially available low-noise block converter comprising an internal local oscillator circuit;

modifying the commercially available low-noise block converter to include the local oscillator input and to disable the internal local oscillator circuit;

coupling the plurality of low-noise block converters to at least one analog-to-digital converter, the at least one analog-to-digital converter being responsive to the intermediate frequency signal of a corresponding low-noise block converter, the at least one analog-to-digital converter outputting a digital signal; and coupling the at least one analog-to-digital converter to a processor, the processor being responsive to the digital signal of the at least one analog-to-digital converter, the processor being adapted to perform digital beamforming algorithms on the digital signal to form a plurality of beams.

14. A method of making a digital beamforming radar system as defined by claim 13, the method further comprising the step of coupling the local oscillator input to an external connector.

15. A method of making a digital beamforming radar system as defined by claim 13, method further comprising the step of disabling the at least one amplifier.

16. A method of making a digital beamforming radar system as defined by claim 13, wherein at least one of the plurality of low-noise block converters includes a custom made low-noise block converter including a local oscillator input.

17. A method of making a digital beamforming radar system as defined by claim 13, the method further comprising the step of providing a damping means internal to the low-noise block converter, the damping means being adapted for substantially suppressing oscillations within the low-noise block converter.

18. A method of making a digital beamforming radar system as defined by claim 13, wherein the low-noise block converter includes a filter circuit having a bandwidth, the method further comprising the step of modifying the bandwidth of the filter circuit to be compatible with the digital beamforming radar system.

19. A method of making a digital beamforming radar system as defined by claim 13, further comprising the step of making a transmitter.

* * * * *